United States Patent [19]

Kumasaka et al.

[11] 4,352,651
[45] Oct. 5, 1982

[54] MOLD EQUIPMENT

[75] Inventors: Sadao Kumasaka, Tanashi; Satomi Tada, Tokyo; Goro Yoneyama, Kawagoe; Kazuo Hashimoto, Kawagoe, all of Japan

[73] Assignee: Toyo Rubber Chemical Industrial Corp., Tokyo, Japan

[21] Appl. No.: 195,472

[22] Filed: Oct. 9, 1980

[30] Foreign Application Priority Data

Oct. 13, 1979 [JP] Japan ................................ 54-132054

[51] Int. Cl.³ ............................................ B29D 27/04
[52] U.S. Cl. .................................. 425/261; 193/35 R; 193/35 MD; 193/35 SS; 264/51; 264/236; 264/237; 264/331.19; 264/338; 425/43.6 R; 425/817 R
[58] Field of Search ............... 425/261, 436 R, 817 R; 264/51, 54, 236, 237, 331.19, 338; 193/35 R, 35 MD, 35 G, 35 SS, 36

[56] References Cited

U.S. PATENT DOCUMENTS

| | | | |
|---|---|---|---|
| 1,102,161 | 6/1914 | Moore | 193/35 C X |
| 1,558,014 | 10/1925 | Jaenicke | 193/35 MD |
| 1,905,379 | 4/1933 | Gotthardt et al. | 193/35 SS X |
| 2,921,336 | 1/1960 | Crafton | 425/261 X |
| 3,090,078 | 5/1963 | Ackles | 264/54 X |
| 3,129,270 | 4/1964 | Hood | 264/54 |
| 3,247,295 | 4/1966 | Burwell | 425/261 X |
| 3,251,092 | 5/1966 | Printz | 264/54 X |
| 3,797,634 | 3/1974 | Field | 193/35 R X |
| 3,898,027 | 8/1975 | Milner | 425/256 |
| 4,047,625 | 9/1977 | Grant | 193/35 MD X |
| 4,215,730 | 8/1980 | Oswald | 264/51 X |

FOREIGN PATENT DOCUMENTS

| | | |
|---|---|---|
| 23316 | 2/1981 | European Pat. Off. . |
| 1124880 | 12/1958 | Fed. Rep. of Germany .... 193/35 R |
| 55-30959 | 3/1980 | Japan . |
| 1283972 | 8/1972 | United Kingdom . |
| 1354295 | 5/1974 | United Kingdom ................ 425/261 |
| 469601 | 7/1973 | U.S.S.R. ............................. 425/261 |
| 413040 | 5/1974 | U.S.S.R. ............................. 425/261 |

OTHER PUBLICATIONS

Sterling Alderfer Co. Bulletin, "Sterling Alderfer Polyurethane Automatic Molding Machine", Akron, Ohio, Sterling Alderfer Co., ~ 1963, 4 pages.

Primary Examiner—Philip Anderson
Attorney, Agent, or Firm—Frishauf, Holtz, Goodman and Woodward

[57] ABSTRACT

A mold equipment comprising a first lift chamber at the outlet portion of a material pouring station, a heating chamber containing a curing atmosphere and connected to the outlet of the first lift chamber, a pull-in means for drawing a metal mold from the outlet of the material pouring station into the first lift chamber, a second lift chamber at the outlet portion of the heating chamber, a mold releasing work station adjacent to the second lift chamber, a third lift chamber at the outlet portion of the mold releasing work station, a cooling chamber connected to the outlet of the third lift chamber, a pull-in means for drawing the metal mold from the outlet of the mold releasing work station into the third lift chamber, a fourth lift chamber defined between the outlet of the cooling chamber and the material pouring work station, and push-in means for forcing the metal mold into the heating chamber, mold releasing work station, cooling chamber, and material pouring station, respectively.

5 Claims, 3 Drawing Figures ion in energy and labor because of an increase in equipment size and extended manufacturing line (usually more than 100 m).

MOLD EQUIPMENT

BACKGROUND OF THE INVENTION

This invention relates to a mold equipment suited for mass production of plastic moldings by means of metal molds.

Most of soft and semihard polyurethane foams, which are generally used in such fields as cushions for vehicles and household furnishings, are manufactured on hot or semi-hot molding equipment.

In one such molding equipment for plastics, a mold transfer conveyor is horizontally disposed in an endless manner at a certain height above a floor so that a metal mold may be circulated at a speed of approximately 5 m/min through several manufacturing processes including pouring, heat curing, cooling, and mold releasing.

With such system using the horizontally circulating conveyor, however, it is very difficult to achieve reduction in energy and labor because of an increase in equipment size and extended manufacturing line (usually more than 100 m).

For example, a hot curing process uses a temperature ranging from 200° C. to 300° C., so that a cooling process subsequent thereto requires a long cooling zone for cooling by means of cooling air or a shower.

Moreover, since a hot blast is generally used for the heat source of a heating oven, the inlet and outlet of the oven must be opened and closed with every passage of the mold therethrough, resulting in a reduced thermal efficiency and increased consumption of heavy oil.

Further, the conveyor continuously extends over the whole length of the manufacturing line, so that it is impossible to adjust the processing time for each process. Thus, constant-speed performance of all processes will necessarily require many operators (usually ten or more operators) for constant attendance for each process.

The inventors hereof have previously proposed as an improvement to counter the aforesaid circumstances a mold equipment (disclosed in Japanese Patent Application No. 104661/78 corresponding to Japanese Patent Disclosure (Kokai) 30959/80, laid-open for public inspection on March 5, 1980) capable of reducing the length of the manufacturing line and the overall equipment size, thereby achieving reduction in labor, energy and equipment cost.

According to the invention described in Japanese Patent Application No. 104661/78, however, metal molds poured with foamable material are continuously arranged over the whole length of a cooling water tank, and one among the row of molds at the tail end thereof is forced out by a push-in cylinder in the conveyance of the molds from the outlet of the water tank into a first lift chamber moving up and down between the water tank and a heating oven for the next process. Also, in carrying the metal molds from the outlet of the oven into a second lift chamber moving up and down between the oven and a water tank for the next process, the tail ender among a row of molds arranged over the whole length of the oven is forced out into the lift chamber. Accordingly, the metal molds in the water tank and oven must be stopped while other molds are moving up and down in the first and second lift chambers. Thus, it would be impossible to fully reduce the time for the circulation of each mold through the mold equipment.

The object of this invention is to provide a mold equipment capable of full reduction in the circulation time of a metal mold and hence in the overall size of the equipment.

SUMMARY OF THE INENTION

According to this invention, there is provided a molding equipment comprising a first lift chamber at the outlet portion of a material pouring station, a heating chamber containing a curing atmosphere and disposed at the outlet portion of the first lift chamber, a pull-in means for drawing a metal mold from the outlet of the material pouring station into the first lift chamber, a second lift chamber at the outlet portion of the heating chamber, a mold releasing work station adjacent to the second lift chamber, a third lift chamber at the outlet portion of the mold releasing work station, a cooling chamber adjacent to the outlet portion of the third lift chamber, a pull-in means for drawing the metal mold from the outlet of the mold releasing work station into the third lift chamber, a fourth lift chamber defined between the outlet of the cooling chamber and the material pouring station, and push-in means for forcing the metal mold into the heating chamber, mold releasing work station, cooling chamber, and material pouring station, respectively.

DETAILED DESCRIPTION

Figure 1:
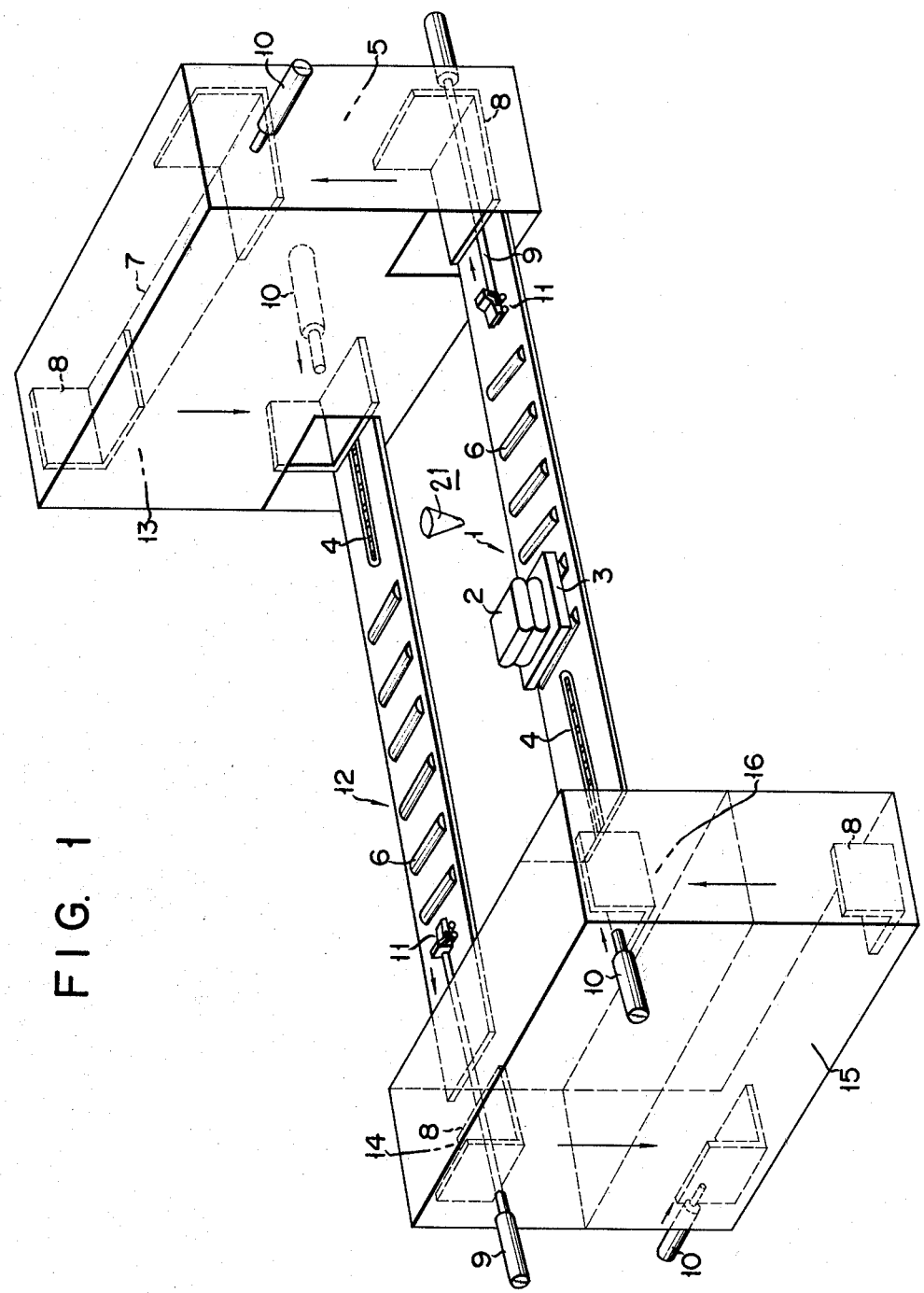
FIG. 1 is a perspective view of a mold equipment according to an embodiment of this invention.

FIG. 1 is a perspective view of a mold equipment according to an embodiment of this invention. In FIG. 1, numeral 1 designates a foamable material pouring station. The inlet portion of the material pouring station 1 incorporates a pouring means 21 and a chain conveyor 4 for conveying a truck 3 bearing a metal mold 2 from the outlet of a fourth lift chamber 16 as mentioned later to the pouring station 1. Between the forward end portion of the chain conveyor 4 and the outlet portion of the material pouring station 1, there is provided a roller conveyor 6 for carrying the truck 3, which is led thereto by the chain conveyor 4, into a first lift chamber 5.

In the first lift chamber 5, there is disposed a lift 8 for carrying the truck 3 to the inlet of an oven 7 (inside lift chamber 5) for the subsequent process. At the inlet portion of the first lift chamber 5 lies a pull-in means 9 for drawing the truck 3, which is led thereto by the roller conveyor 6, from the outlet end of the roller conveyor 6 into the lift 8. The pull-in means 9 comprises a piston and a cylinder containing the same. At the outlet portion of the first lift chamber 5 extends a push-in means 10 for leading the truck 3, which is raised to the upper stage of the chamber 5 by the lift 8, into the oven or heating chamber 7. The push-in means 10 also in composed of a piston and a cylinder containing the same.

Figure 2A:
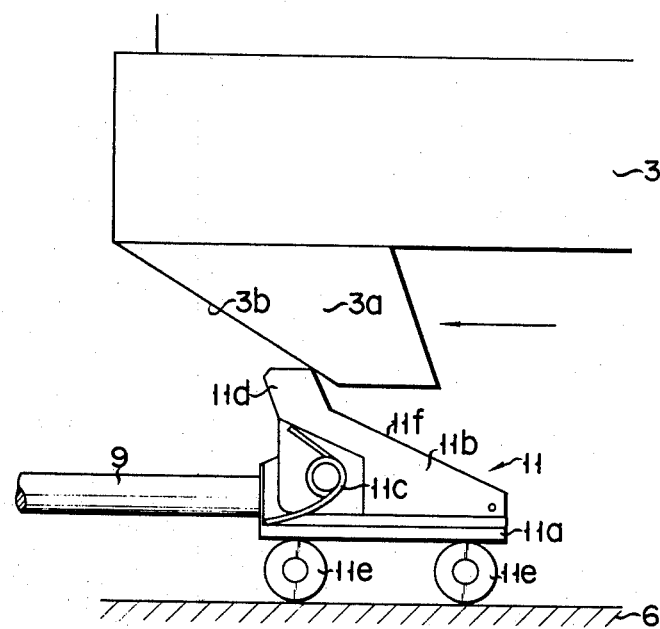
FIG. 2(A) is a view for illustrating the positional relationship between a tractor attached to a pull-in means of the mold equipment of FIG. 1 and a truck immediately before they engage each other.
Figure 2B:
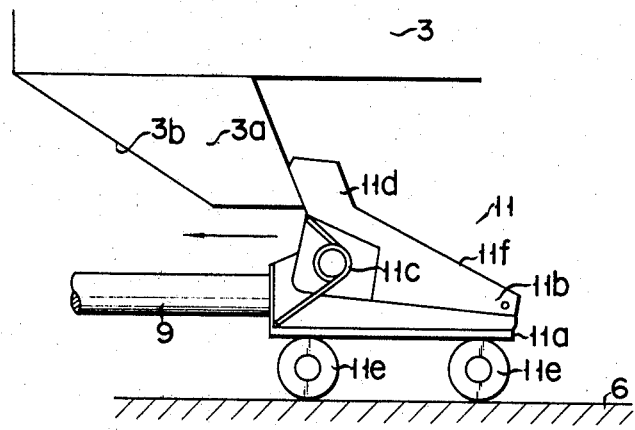
FIG. 2(B) is a view for illustrating the engagement between the tractor and the truck shown in FIG. 2(A).

The pull-in means 9 moves in synchronism with the lift 8 and the roller conveyor 6 in the material pouring station 1 so that the truck 3 bearing the metal mold 2 may be continuously carried on the lift 8 into the oven 7 for the next stage without stopping at the inlet portion of the first lift chamber 5. As shown in FIG. 2(A), moreover, a tractor 11 is coupled with the forward end of the piston of the pull-in means 9. The tractor 11 has running wheels 11e attached to the bottom of a chassis 11a which is coupled to the forward end face of the piston, whereby reciprocating between the outlet portion of the roller conveyor 6 and the inlet of the first lift chamber 5. The chassis 11a is provided with an engaging member 11b to engage a hook member 3a attached to the bottom of the truck 3. The engaging member 11b is mounted on the chassis 11a so as to be able to be moved up and down by a torsion spring 11c. When the truck 3 is led to the outlet portion of the roller conveyor 6, a slant face 3b of the hook member 3a slides along a slant face 11f of the engaging member 11b. Then, the engaging member 11b is subjected to a pressure as the truck 3 moves forward, the torsion spring 11c is compressed by the pressure, and the engaging member 11b is pressed down against the surface of the chassis 11a. As a result, the hook member 3a is located at the rear end portion of the engaging member 11b. In this state, when the tractor 11 is pulled back by the pull-in means 9, a projection 11d of the engaging member 11b engages the rear end portion of the hook member 3a, as shown in FIG. 2(B), to lead the truck 3 into the lift 8 in the first lift chamber 5.

The oven 7 communicating with the outlet of the first lift chamber 5 contains therein a roller conveyor (not shown) for facilitating the travel of the truck 3 along the longitudinal direction of the oven 7, and is filled with high-temperature steam as a curing atmosphere. Further, the oven 7 is provided with inlet and outlet ports (not shown) for the high-temperature steam, a heat regulator (not shown), etc. so that a suitable temperature for heat curing may be obtained as required. For the oven 7 applicable to this invention, there may be used an oven which utilizes a hot blast or electric heat for its heat source, besides the steam oven.

The outlet portion of the oven 7 is connected with a second lift chamber 13 which is provided with a lift 8 for carrying the truck 3 to a mold releasing work station 12 for the next process. A chain conveyor 4 is disposed between the outlet portion of the second lift chamber 13 and the mold releasing work station 12. The chain conveyor 4 carries the truck 3 onto a roller conveyor 6 disposed in the mold releasing work station. The chain conveyor 4 need only be twice or more as long as the overall length of the truck 3 and be able to lead the truck 3 into the mold releasing work station 12 at a fixed speed. A third lift chamber 14 is disposed at the outlet portion of the mold releasing work station 12. The third lift chamber 14 contains a lift 8 for carrying the truck 3, which is delivered thereto from the mold releasing work station 12, into a cooling chamber such as water tank 15 for the subsequent process. At the inlet portion of the third lift chamber 14 lies a pull-in means 9 for drawing the truck 3, which is carried to the outlet portion of the mold releasing work station 12 by the roller conveyor 6, into the lift 8 in the third lift chamber 14. At the outlet portion of the third lift chamber 14, there is disposed a push-in means 10 for introducing the truck 3 into the water tank 15. At the bottom of the water tank 15 extends a roller conveyor (not shown) for conveying the truck 3 into the fourth lift chamber 16 at the outlet portion of the water tank 15. Like the other lift chambers, the fourth lift chamber 16 contains a lift 8 for carrying the truck 3 to the material pouring work station 1, and is provided at its outlet portion with a push-in means 10 for delivering the truck 3 to the material pouring work station 1. At the inlet portion of the material pouring work station 1, there is provided the chain conveyor 4 whereby the truck 3 will proceed to the roller conveyor 6.

According to the mold equipment of this invention, foamed articles are continuously manufactured as follows.

The truck 3 bearing the metal mold 2 which has its inside coated with a mold releasing agent and is fully cooled in the water tank 15 is fed from the outlet of the fourth lift chamber 16 into the material pouring work station 1 by means of the chain conveyor 4. The truck 3 proceeds from the chain conveyor 4 to the roller conveyor 6, and continues travelling toward the inlet of the first lift chamber 5. In this state, a given amount of foamable material containing isocyanate, polyol and catalyst is poured into the metal mold 2, and the mold 2 is closed. When the truck 3 loaded with the closed mold 2 is led to the inlet portion of the first lift chamber 5, it is quickly drawn into the lift 8 in the first lift chamber 5 by the pull-in means 9. Then, the lift 8 rises to carry the truck 3 loaded with the metal mold 2 to the inlet portion of the oven 7. When carried to the outlet of the first lift chamber 5, the truck 3 is pushed into the oven 7 by the push-in means 10. The emptied lift 8 is returned to the inlet portion of the first lift chamber 5. Since another truck 3 bearing a new metal mold 2 is to reach a position it engages the tractor 11 of the pull-in means 9 when the lift 8 is returned or lowered, the pull-in means 9 quickly draws the truck 3 into the lift 8. Subsequent trucks 3 are continuously fed through the material pouring work station 1 into the oven 7 in like manner.

Since a given curing atmosphere is provided inside the oven 7, the foamable material in the metal mold 2 is foamed while the truck 3 is passing through the oven 7. After the foaming, the truck 3 is carried from the outlet of the oven 7 to the inlet of the mold releasing work station 12 by the lift 8 in the second lift chamber 13. When the lift 8 reaches the inlet of the mold releasing work station 12, the truck 3 is forced into the mold releasing work station 12 by the push-in means 10, and moved to the roller conveyor 6 in the mold releasing work station 12. Since the action of the push-in means 10 is synchronous with the movement of the lift 8, the truck 3 bearing the metal mold 2 can be continuously led into the mold releasing work station 12 without stopping.

In the mold releasing work station 12, a foamed article is removed from the metal mold 2 on the truck 3 running on the roller conveyor 6, and the mold releasing agent is applied to the inside of the mold 2 for the next foaming operation. When the truck 3 reaches the outlet portion of the mold releasing work station 12, it is drawn into the lift 8 in the third lift chamber 14 by the pull-in means 9, and is carried into the water tank 15 for the subsequent process. Since the lift 8 and the pull-in means 9 move in synchronism with the truck 3 being carried out from the mold releasing work station 12, the truck 3 may be continuously led into the water tank 15. The metal mold 2 on the truck 3 introduced from the third lift chamber 14 into the water tank 15 by the push-in means 10 is fully cooled while passing through the water tank 15, and is carried to the inlet portion of the material injection work station 1 by the lift 8 in the fourth lift chamber 16. Also in the transfer of the truck 3 from the outlet of the fourth left chamber 16 to the material pouring work station 1, the truck 3 may be continuously carried without stopping by the lift 8, push-in means 10, and chain conveyor 4 which move synchronously with one another.

Thereafter, the aforementioned operation is repeated to circulate the metal mold 2 continuously. Thus, the circulation speed of the mold 2 may be increased to improve the productivity and to reduce the overall size of the mold equipment.

Since the material pouring work station 1, oven 7, mold releasing work station 12, and water tank 15 are integrally constructed to form a circuit, the manufacturing line can naturally be reduced in length.

Moreover, the use of the roller conveyors 6 for the conveyance of the truck 3 in the material pouring work station 1, oven 7, mold releasing work station 12, and water tank 15 may lead to a reduction of power consumption. Further, the running speed of the truck 3 can freely be adjusted by the push-in means 10 attached to the lift chambers 5, 13, 14 and 16.

In the above-mentioned embodiment, the truck 3 is drawn into the lift chambers 5 and 14 by the pull-in means 9 which are each fitted with the tractor 11. Alternatively, however, there may be used any other pull-in means that can continuously draw the truck 3 into the lift chambers 5 and 14 in synchronism with the movement of the lifts 8.

Practically, the roller conveyors as mentioned in conjunction with the above embodiment are preferably used for the conveyors (not shown) disposed in the water tank 15 and the oven 7. It is to be understood, however, that the invention is not limited to such roller conveyors, and that conveyors of any types may be utilized as long as they allow the truck 3 to run thereon in a suitable manner.

Thus, the mold equipment of this invention can achieve reduction in equipment cost, labor and energy in the field of molding operation which requires hot and semi-hot curing processes as well as urethane foam for the material. In particular, the use of the pull-in means at the inlet portion of each lift chamber greatly reduces the circulating time of the metal mold, so that the overall size of the equipment may be decreased by a large margin.

What we claim is:
1. A mold equipment comprising:
a material pouring station (1);
a first lift chamber (5) at the outlet portion of said material pouring station;
a heating chamber (7) containing a curing atmosphere and disposed at the outlet portion of said first lift chamber;
a pull-in means (9) for drawing a metal mold from the outlet of said material pouring station into said first lift chamber (5);
a second lift chamber (13) at the outlet portion of said heating chamber (7);
a mold releasing work station (12) adjacent to said second lift chamber (13);
a third lift chamber (14) at the outlet portion of said mold releasing work station (12);
a cooling chamber (15) adjacent to the outlet portion of said third lift chamber (14);
a pull-in means (11) for drawing said metal mold from the outlet of said mold releasing work station (12) into said third lift chamber (14);
a fourth lift chamber (16) defined between the outlet of said cooling chamber (15) and said material pouring station (11); and
push-in means (10) for forcing said metal mold into said heating chamber, mold releasing work station, cooling chamber, and said material pouring station, respectively;
said material pouring station (1), heating chamber (7), mold releasing work station (12), and cooling chamber (15) are each provided at respective bottom portions thereof with a roller conveyor to facilitate the running of said metal mold forced thereinto by said push-in means;
said metal mold being placed on a truck which runs on said roller conveyor;
each of said push-in means including a piston to push said truck, and a cylinder containing said piston; and
each of said pull-in means including a piston to pull said truck, and a cylinder containing said piston thereof.

2. The mold equipment of claim 1, further comprising a chain conveyor (4) mounted between said fourth lift chamber (16) and said material pouring station (1) for conveying a metal mold from said fourth lift chamber to said material pouring station.

3. The mold equipment of claim 1 or claim 2, further comprising a further chain conveyor (4) mounted between said second lift chamber (13) and said mold releasing work station (12) for conveying a metal mold from said second lift chamber to said mold releasing work station.

4. The mold equipment of claim 1, wherein said heating chamber extends above said material pouring station (1) and said mold releasing work station (12), and said cooling chamber (15) extends below said material pouring station (1) and said mold releasing work station (12); and said first lift (5) includes means (8) for lifting said metal mold from said material pouring work station to the upper portion of said heating chamber (7) and said second lift (13) includes means for then lowering said metal mold to the level of said mold releasing work station; and said third lift means (14) includes means (8) for lowering said metal mold from the level of said mold releasing work station (12) to the lower portion of said cooling chamber (15) and said fourth lift means (16) includes means for then raising said metal mold to the level of said material pouring work station (1).

5. The mold equipment of claim 4, further comprising a chain conveyor (4) mounted between said fourth lift chamber (16) and said material pouring station (1) for conveying said metal mold from said fourth lift chamber to said material pouring station; and a further chain conveyor (4) mounted between said second lift chamber (13) and said mold releasing work station (12) for conveying said metal mold from said second lift chamber to said mold releasing work station.

* * * * *